Aug. 1, 1967
M. E. DURHAM
3,333,718
TOWING TRAILER
Filed Nov. 3, 1965
2 Sheets-Sheet 1
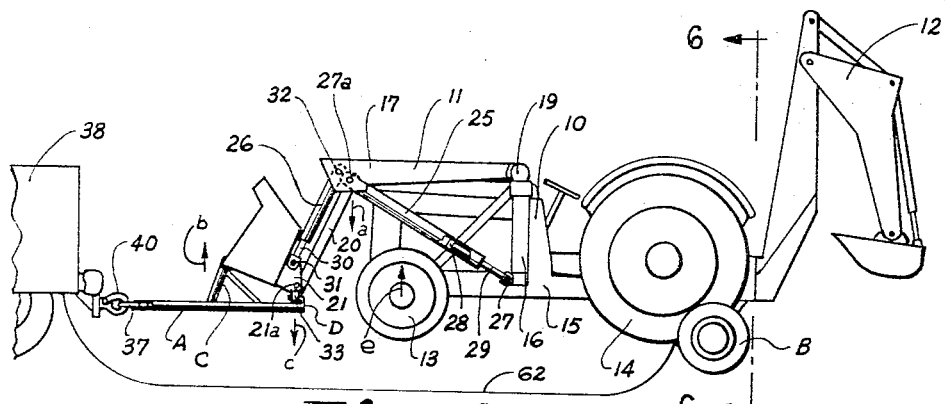
Fig. 1.
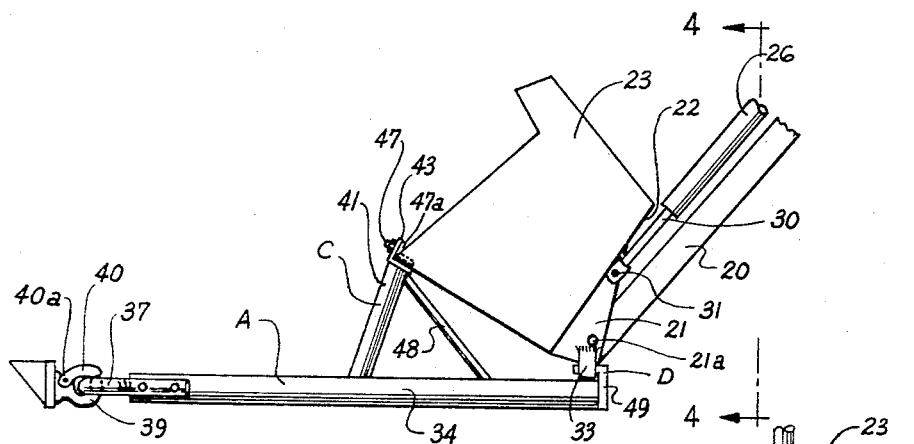
Fig. 2.
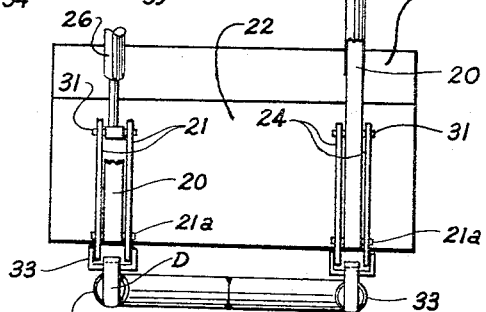
Fig. 4.
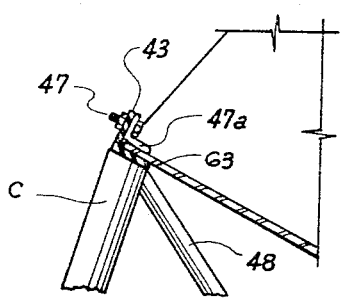
Fig. 3.
INVENTOR.
MARION E. DURHAM
BY
ATTORNEY Aug. 1, 1967  M. E. DURHAM  3,333,718
TOWING TRAILER Filed Nov. 3, 1965  2 Sheets-Sheet 2

INVENTOR.
MARION E. DURHAM
BY
ATTORNEY ured Aug. 1, 1967

United States Patent Office 3,333,718
Patented Aug. 1, 1967

3,333,718
TOWING TRAILER
Marion E. Durham, 4 Range View Circle,
Greenville, S.C. 29611
Filed Nov. 8, 1965, Ser. No. 506,669
4 Claims. (Cl. 214—778)

ABSTRACT OF THE DISCLOSURE

The specification discloses an apparatus for towing road equipment, such as tractors having a hydraulic lift mechanism adjacent the front.

This invention relates to a carrier for transporting slow moving road equipment such as shovels, bulldozers, tractors and the like, having a lift mechanism adjacent a front portion of the road equipment.

Heretofore, road equipment has been transported on trailers such as one type commonly called low-boy trailers. Trailers for carrying heavy road equipment are expensive as well as inconvenient in that when the road equipment is placed in a carrying position on the trailer, it must be secured to the trailer. One method of securing the road equipment to the trailer contemplates using chains to attach the road equipment to the trailer bed. This method of transporting the road equipment is time consuming and requires the use of an expensive trailer. Another method of securing the road equipment to the trailer contemplates using blocks for blocking the wheels. The blocks must be anchored to the trailer in order to prevent slippage.

The present novel construction for a road equipment carrier eliminates the above problems, and provides a simple and inexpensive structure for transporting road equipment.

Accordingly, it is an object of the present invention to provide a carrier device for transporting road equipment such as shovels, tractors, bulldozers and the like.

Another object of the present invention is to provide a trailer for road equipment which effects a material simplification over conventional trailers by the expedience of eliminating the trailer bed and front wheels.

Still another object of the present invention is to provide a carrier for road equipment that is simple and inexpensive.

A further object of the present invention is to provide a carrier device having a front carrier member which is to be secured to a hydraulic lift mechanism adjacent the front of a tractor for supporting the front portion of the tractor, and a rear carrier member in spaced relation to the front carrier positioned beneath a rear portion of the tractor for supporting same so that the tractor can be transported.

Still another object of the present invention is to provide a novel carrier for a tractor or the like having a hydraulic lift adjacent the front portion which is easy to use, and onto which a tractor may be quickly mounted and connected to a tow truck, and later be quickly and easily disconnected and dismounted.

Figure 5:
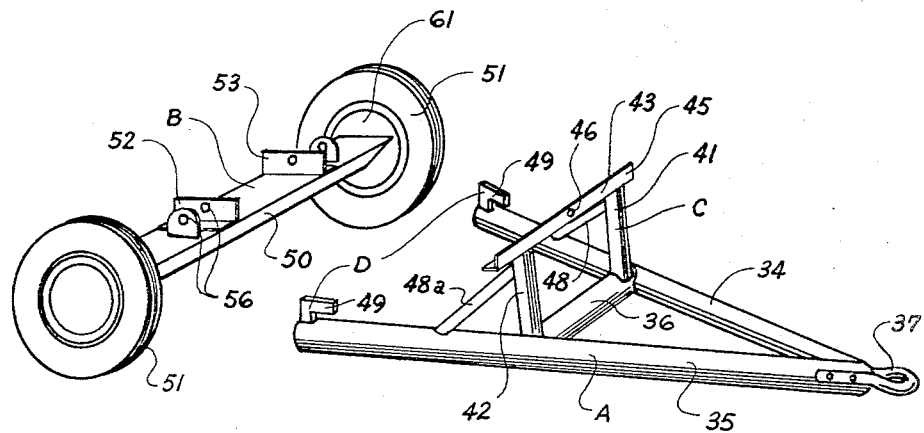
Figure 6:
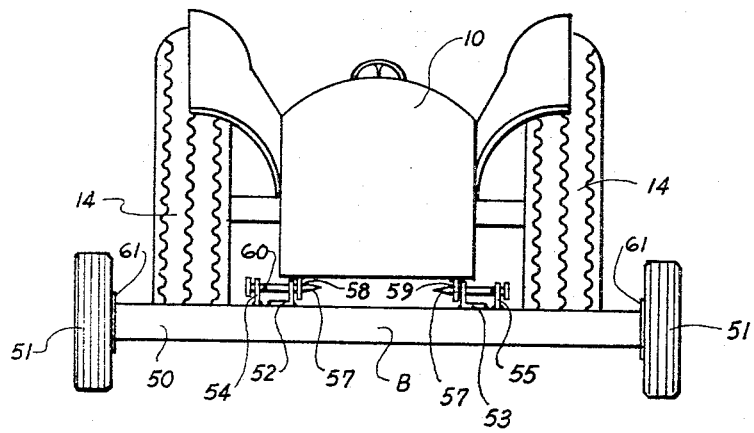

The invention will be more readily understood from a reading of the following specification and by reference to the accompanying drawings forming a part thereof, wherein an example of the invention is shown and wherein:

FIGURE 1 is a side elevation of one embodiment of a carrier device for transporting a tractor constructed in accordance with the present invention with parts of the tractor being illustrated diagrammatically, FIGURE 2 is an enlarged fragmentary view in side elevation of the front carrier engaging a bucket connected to a hydraulic lift mechanism of a tractor, FIGURE 3 is an enlarged fragmentary view illustrating the manner in which a cutting edge of a bucket connected to a hydraulic lift mechanism of a tractor engages the carrier device, FIGURE 4 is a transverse sectional view taken along line 4—4 of FIGURE 2, FIGURE 5 is a disassembled view of the carrier device illustrated in FIGURE 1, and FIGURE 6 is a transverse sectional view taken along line 6—6 of FIGURE 1.

The drawings illustrate a trailer for transporting slow moving road equipment such as shovels, bulldozers and tractors, having a hydraulically operated lift mechanism adjacent a front portion for use with a vehicle having a hitching element thereon. The trailer includes a front carrier A and a rear carrier B spaced rearwardly of said front carrier, the rear carrier B comprising an axle means with wheels rotatably mounted thereon. The rear carrier B is positioned beneath a rear portion of the road equipment for supporting same. The front carrier A includes a frame. The frame has a hitching element for engaging the hitching element on the vehicle for pulling the trailer. Spaced support members C and D are carried on the frame. The support members engage the hydraulically operated lift mechanism of the road equipment. The support member C exerts an upward force on the hydraulically operated lift mechanism of the road equipment. The other support member D exerts a downward force on the hydraulically operated lift mechanism of the road equipment when the road equipment is in carrying position. The hydraulically operated lift mechanism when lowered against the front carrier A results in the raising of the front portion of the road equipment. Thus, the road equipment is supported by the rear carrier B and by the front carrier A.

A detailed description of the trailer construction and the manner in which it carries an industrial four-wheeled tractor may be understood by referring to the drawings. The tractor 10 with a hydraulically operated front-end loader 11 and a hydraulically operated back hoe 12 are illustrated in a diagrammatic manner since such is a common, well known unit. The tractor illustrated in FIGURE 1 is a Ford Industrial Tractor, Model No. 4000 with a Ford front-end loader Model No. 712, and a Ford back hoe Series 723. The tractor 10 includes front steering wheels 13, large diameter rear driving wheels 14, and a body frame 15 mounted upon the wheels.

The front-end loader 11, which is carried adjacent a front portion of the tractor, includes a vertical standard or brace 16 which is fixed to the frame of the tractor by any suitable means such as bolting. A boom 17 is pivotally connected to the top of the vertical standard 16 by a pivot joint 19. As illustrated in FIGURE 1, the boom extends outwardly and terminates in a downwardly extending support 20 so that the rigid boom has the shape of an obtuse angle. It is noted that the downwardly extending support 20 is rigidly fixed to the boom 17. The free-end of downwardly extending support 20 is pivotally connected between a pair of triangular shaped braces 21 by a pivot joint 21a. One pair of braces 21 is connected, by welding, adjacent to one side of a bottom 22 of a bucket 23, while another pair of braces 24 are connected adjacent the other side of the bottom 22 of the bucket 23. An identical boom and hydraulically operated lifting mechanism is carried on the opposite side of the tractor 10 from that illustrated in FIGURE 1 and cooperates with the boom 17 in raising and lowering the bucket 23.

The hydraulic mechanism utilized in raising and lowering the bucket 23 includes a pair of hydraulically operated members 25 and 26. The hydraulically operated member 25 has one end pivotally connected by pivot joint 27 to the base of the vertical brace 16. The other end of the hydraulically operated member 25 is pivotally connected by a pivot joint 27a to the boom. The hydraulically operated member 25 consists of a cylinder with a piston 28 therein. When fluid is inserted into the cylinder on the upper side of the piston 28, such is lowered causing the piston rod 29 to bear against the pivot joint 27, thus raising the boom 17. When fluid is inserted into the other side of the piston, the boom 17 and the bucket carried adjacent its end is lowered. The hydraulically operated member 26 operates in the same manner as member 25, and such is used to tilt or pivot the bucket 23 about the pivot joint 21a. A piston rod 30 carried by hydraulically operated member 26 is pivotally connected to the braces 21 by a pivot joint 31. The other end of the hydraulically operated member 26 is pivotally connected to the boom 17 by a pivot joint 32.

A U-shaped bracket 33 is welded between the bases of each pair of braces 21 and 24 to prevent the braces from spreading apart when the front-end loader is lifting a heavy load. The U-shaped brackets also serve as a means of securing the front carrier A to the hydraulic lift mechanism.

The front carrier A includes an A-shaped frame formed of two side members 34 and 35, which are joined at one end, and a cross brace 36 welded between the two side members. A circular trailer hitch 37 having an opening therein is bolted to the side members at the point where they are joined. The front carrier A can be coupled to a vehicle 38, such as a pick-up truck, by means of the hitching element 37. The hitching element 37 fits on an upwardly projecting portion 39 of a cooperating hitching element carried on the pick-up truck 38. An upper locking member 40 is pivoted about pin 40a to lock the hitching element 37 onto the upwardly projecting portion 39.

Spaced support members C and D are carried on the frame. The support members engage the hydraulic lift portion of the tractor. The support member C includes a pair of upwardly extending braces 41 and 42 each having one end welded to the side members 34 and 35, respectively. An angle iron 43 has a horizontal flange welded to the free-ends of the upwardly extending braces 41 and 42. The vertical flange of the angle iron 43 has an aperture 46 in the medial portion thereof through which a bolt 47 passes to secure a complementary angle iron 47a thereto. The complementary angle iron 47a has an aperture in its vertical flange for receiving the bolt 47. When the cutting edge of the bucket 23 is placed between the horizontal flanges of the angle irons 43 and 47a, and the two flanges are bolted together by bolt 47 extending through the vertical flanges of the angle irons, the cutting edge of the bucket is held in position. A brace 48 is welded between the side member 34 and the upwardly extending brace 41. A corresponding brace 48a is welded between the side member 35 and the upwardly extending brace 42.

The support member D consists of a pair of hook shaped metal brackets 49 carried adjacent the ends of the side members 34 and 35. When the trailer is in the carrying position the hook shaped brackets 49 extend into the U-shaped brackets 33 for aiding the support member C in securing the front-end loader to the front carrier A.

The rear carrier B comprises an axle 50 with wheels 51 rotatably mounted thereon. The rear carrier B is positioned (FIGURE 1), beneath a rear portion of the road equipment for supporting same. The rear carrier has a pair of spaced upwardly extending brackets 52 and 53 welded thereto. Each of the brackets has a cooperating upright bracket 54 and 55, respectively, positioned on the axle adjacent thereto. The cooperating pairs of brackets 52–54 and 53–55, have aligned apertures 56 therein for receiving a spike 57.

A pair of downwardly extending brackets 58 and 59 are welded to the bottom of the tractor adjacent the rear portion of the tractor. Both of the brackets 58 and 59 have apertures therein. The rear carrier B is secured in position beneath the tractor by inserting the spike 57 through the apertures in brackets 52 and 54 on the axle, and the aperture in bracket 58 carried on the bottom of the tractor. A similar spike is inserted through the brackets 53 and 55 to secure the bracket 59 to the axle. The spikes are provided with a hole for receiving a locking device, such as a cotter pin 60, so that such can be locked in position.

In order to position the rear carrier beneath the tractor the rear portion of the tractor may be raised by bearing down the back hoe 12 against the pavement. If the tractor is not equipped with a rear hydraulically operated lift mechanism, then the tractor can be driven upon a mound of earth or the like, and the rear carrier can be positioned beneath the raised rear portion of the machine.

The wheels 51 upon which the axle is supported are provided with electric brakes 61. The brakes are connected by a wire 62 to the braking system of the truck so that they may be activated simultaneously with the truck's braking system. The brake wire is wrapped around the tractor when such is in the carrying position to prevent it from dragging the ground. The electric brakes may be a conventional type as long as they operate satisfactory. One suitable type wheel assembly with electric brakes is sold by Fayette Manufacturing Co., located in Americus, Ga.

After the rear carrier B is positioned beneath the rear portion of the tractor, the front carrier A is connected to the hydraulically operated lift mechanism, such as a front-end loader, adjacent the front of the road equipment. Normally, the front carrier A is first connected by hitching element 37 to the cooperating hitching element carried on the pick-up truck 38. The bucket 23 that is carried by the hydraulically operated lift mechanism is then tilted by the hydraulic mechanism 26 so that the hook shaped support members D can fit into the U-shaped brackets 33. The cutting or digging edge 63 of the bucket rests on the horizontal flange of angle iron 43. The horizontal flange of a complementary angle iron 47a is placed on top of the cutting edge of the bucket and a bolt 47 is passed through an aperture in the vertical flanges of the angle irons to secure the cutting edge of the bucket between the angle irons 43 and 47a. A nut is threaded on the bolt 47 to lock it in position.

After the front carrier A has been secured to the front-end loader, the operator causes, by means of the hydraulically operated mechanism 25, the front-end loader to bear down on the carrier A. The force bearing down on the carrier A is in the direction of the arrow a. Due to the manner in which the front carrier is connected to the bucket, the support member C exerts an upward force on the cutting edge of the bucket 23 as indicated by arrow b. The support member D, which consists of the hook shaped brackets 49, exerts a downward force on the U-shaped brackets 33 as indicated by the arrow c. As a result of the above forces, the front carrier A is raised to a substantially horizontal carrying position while the front of the tractor is raised off the ground as indicated by the arrow e. It is to be noted that the support members C and D may take the form of a single plate carried on a frame with a connecting device coupling the front-end loader to the plate. If a plate is used, it should be large enough and strong enough so that a force transfer can take place therein. Other types of support members may be utilized as long as they permit a transfer of forces similar to those discussed above.

The trailer, as illustrated, is being used to transport an industrial tractor with a front-end loader. However, it is to be noted that such can be utilized, with minor modifications, to transport other types of road equipment that have a lifting mechanism adjacent to a front portion of the vehicle.

While a preferred embodiment of the invention has been described using specific terms, such description is for illustrative purposes only, and it is to be understood that changes and variations may be made without departing from the spirit or scope of the following claims.

What is claimed is:

1. A trailer for transporting slow moving road equipment such as shovels and tractors, having a hydraulically operated lift implement adjacent a front portion, for use with a vehicle having a hitching element thereon comprising: a front carrier and a rear carrier spaced rearwardly of said front carrier; said rear carrier comprising an axle means, wheels rotably mounted on said axle means, said rear carrier being positioned beneath a rear portion of said road equipment for supporting same off the ground during transportation; said front carrier including a frame, said frame having a hitching element for engaging the hitching element on said vehicle for pulling said trailer; spaced support members carried on said frame, said support members engaging the hydraulically operated lift implement of said road equipment, one of said support members exerting an upward force on the hydraulically operated lift implement of said road equipment, the other support member exerting a downward force on said hydraulically operated lift implement of said road equipment when said road equipment is in carrying position; and said hydraulically operated lift implement when lowered against said front carrier resulting in the raising of the front portion of said road equipment; whereby the road equipment is supported by the rear carrier and the front carrier.

2. The structure as set forth in claim 1, wherein said one of said support members includes an upright support member having one end attached to an intermediate portion of said frame and a clamping member carried adjacent the other end of said upright support member for engaging a portion of said lift implement, and wherein said other support member includes, a hook shaped structure carried adjacent an end of said frame remote from said hitching element for engaging another portion of said lifting implement, whereby the clamping mechanism and the hook shaped structure secure the hydraulic lift to said frame.

3. The structure as set forth in claim 1, wherein said rear carrier has a pair of spaced upwardly extending brackets carried on the axle means, a pair of downwardly extending brackets carried on the rear bottom portion of said road equipment, and means for connecting the brackets on said rear carrier to said brackets on said road equipment so that the rear carrier supports the road equipment off the ground.

4. The structure as set forth in claim 1, wherein the hydraulically operated lift implement that the support members engage includes a bucket, said one of said support members exerting an upward force on a cutting edge of said bucket, a bracket carried by the bucket spaced from said cutting edge thereof, said other support member exerting a downward force on said bracket to secure the bucket to said frame.

References Cited

UNITED STATES PATENTS

| | | | |
|---|---|---|---|
| 2,639,926 | 5/1953 | Parks | 280—47.15 |
| 2,943,863 | 7/1960 | Corey et al. | 280—47.13 X |
| 2,995,261 | 8/1961 | Soyland et al. | 214—138 |
| 3,169,650 | 2/1965 | Soyland | 214—138 |

HUGO O. SCHULZ, *Primary Examiner.*